United States Patent [19]
Schwartz

[11] Patent Number: 5,904,270
[45] Date of Patent: May 18, 1999

[54] MATERIAL LOADER AND SPREADER ATTACHMENT

[76] Inventor: Louis S. Schwartz, 3600 Kreidersville Rd., Northampton, Pa. 18067

[21] Appl. No.: 08/896,453

[22] Filed: Jul. 18, 1997

[51] Int. Cl.$^6$ .................................................. B67D 5/08
[52] U.S. Cl. ........................... 222/64; 222/637; 141/67; 141/198
[58] Field of Search ..................... 222/52, 64, 630, 222/637; 141/67, 192, 198; 239/654

[56] References Cited

U.S. PATENT DOCUMENTS

| | | | |
|---|---|---|---|
| 4,815,414 | 3/1989 | Duffy et al. | 239/654 X |
| 5,109,893 | 5/1992 | Derby | 141/67 |

*Primary Examiner*—Gregory L Huson

[57] ABSTRACT

An air plenum is located within a conduit forming a spout for a granular material supply tube, and air is fed through the air plenum while granular material flows around the plenum and out of the spout. The moving air carries the material away from under the spout and permits the receiving compartment to be completely filled. A material flow control valve is constructed in the annular space around the air plenum by using a fixed plate and a rotatable plate, each with matching holes. If material accumulates to a height blocking the spout, a level sensor within the spout activates a pneumatic cylinder which causes the material flow valve to close by misaligning the holes. The continuing air flow then distributes the material throughout the receiving compartment, and when the level sensor is free of material the flow valve reopens. A pressure sensor in the air system also controls the granular material flow to shut off the flow when the air pressure builds up because the receiving compartment is full.

7 Claims, 3 Drawing Sheets

MATERIAL LOADER AND SPREADER ATTACHMENT

BACKGROUND OF THE INVENTION

This invention deals generally with the loading of containers with granular material, and more specifically with a spout which permits the complete filling of a compartment from a single hatch.

The loading of granular materials into bulk carriers such as railcars or trucks is a common requirement in industry. Generally this loading is accomplished with a retractable gravity flow spout supplied with material from a source above the carrier. However, this technique has a limitation because the material being loaded tends to accumulate directly below the loading hatch and form a mound. The volume of material in such a mound is determined by the angle of repose of the specific material, but regardless of the material, the space in the carrier immediately surrounding the hatch does not fill up.

Even the use of several hatches does not solve this problem because a mound forms under each hatch. Sometimes the carrier is vibrated to attempt to reduce such mounds and completely fill the carrier. However, vibrating such a large structure is difficult and requires a significant investment in complicated equipment which is also difficult to maintain. In addition, vibrating such a large carrier may also cause actual structural damage to the carrier.

SUMMARY OF THE INVENTION

The present invention solves the problem of the inability to completely fill the receiving compartment when loading bulk materials by using a simple and inexpensive apparatus.

The invention is a loading spout for installation on the end of the typical flexible tube which is usually placed just within the hatch of the carrier to be filled. The loading spout of the invention is constructed with two concentric cylinders with the inner cylinder closed off at the end nearer to the material supply. The outer cylinder is connected to the source of the granular material and acts as a conduit for the granular material which flows through the annular space between the cylinders and out the lower end of the outer cylinder.

The inner cylinder is an air plenum located within the outer cylinder conduit, and air from a forced draft fan is fed through the air plenum while granular material flows around the plenum and out of the lower end of the conduit. The moving air carries the granular material away from under the spout. The material mound under the loading head acts in conjunction with the air outlet to effectively form an orifice which directs the air radially outward and carriers the material in the annulus away from the mound. This thereby permits the receiving compartment to be filled at or much closer to capacity than previously.

When the compartment reaches a nearly full space, reducing the amount of empty space in the compartment, there is created an increased pressure drop to move the material and air through this more restricted space. As a result, under such conditions the amount of energy required to spread material may be greater than what is available from the incoming air flow. In effect, the pressure is too great at the air exit. In such situations the top of the mound of granular material can rise into the loading spout, plug the air plenum, and defeat the action of the air flow.

To overcome this problem a material flow control valve is constructed within the loading spout. This valve is located within the annular space between the air plenum and the wall of the outer cylinder. The valve is constructed by using a fixed plate attached within the annular space. This fixed plate has a set of large holes whose centers are on a circle around the annular space. Thus, if the holes in the fixed plate are unobstructed, there is only a minor restriction to affect the flow of granular material through the annular space.

The moving portion of the valve is a rotatable plate which is in contact with the fixed plate, and which also contains a set of holes. The holes on the rotatable plate exactly match those of the fixed plate, so that the rotatable plate can be positioned with its holes exactly aligned with the holes on the fixed plate, and the flow of the granular material is then relatively unrestricted. Both hole patterns are constructed such that each hole is spaced from its adjacent holes by a distance approximating the diameter of the holes. This pattern means that rotating the rotatable plate the distance of only one hole diameter causes all the holes to be covered, and the flow of the granular material is completely stopped. Alternatively, the holes can be covered to varying degrees to reduce, but not completely stop, the flow relative to the full open position.

The invention may use a simple pneumatic piston to activate the granular flow. The pneumatic piston is attached to a radial arm extending out from the outer circumference of the rotatable plate and through a slot in the outer wall of the outer cylinder. In this manner the travel of the pneumatic piston need not be much greater than the required movement of the rotatable plate.

As noted above, the reason for the requirement of cutting off the granular flow is the possibility that, because of differences in granular material or even environmental conditions, the air flow provided may not completely prevent the accumulation of a mound of material under the outlet of the spout. To accommodate to this, a conventional level sensor is installed at a predetermined level relative to the spout to sense if the mound of granular material has risen to such a height that it is close to the material outlet of the spout or even within the spout. A preferred location for such a sensor is between two holes in the fixed plate of the flow control valve. Such a location prevents the flow of material from directly affecting the level sensor, and limits the response of the sensor to sensing only the actual accumulation of the exiting material.

When the level sensor is affected by the rising mound of material, the sensor activates the pneumatic piston, causing it to move the rotating plate to close or partially constrict the valve and stop or reduce the flow of the granular material. However, the air flow is unaffected.

The continuing air flow then continues to move the material from the accumulated mound, and it distributes the material throughout the receiving compartment. When the air flow has reduced the mound so that it no longer affects the level sensor, the flow valve may reopen fully or partially, and the loading operation may continue.

The invention also includes a means to sense the completion of filling the container. An air pressure sensor located within the air system senses the air pressure increase due to the filling of the receiving container. This increase in air pressure is used to initiate the movement of the rotatable plate to close the granular material flow valve because the receiving compartment is full.

The loading spout of the invention thereby permits a bulk carrier to be fully loaded from a single hatch and to fully utilize the entire volume of the carrier.

BRIEF DESCRIPTION OF THE INVENTION

DETAILED DESCRIPTION OF THE INVENTION

Figure 1:
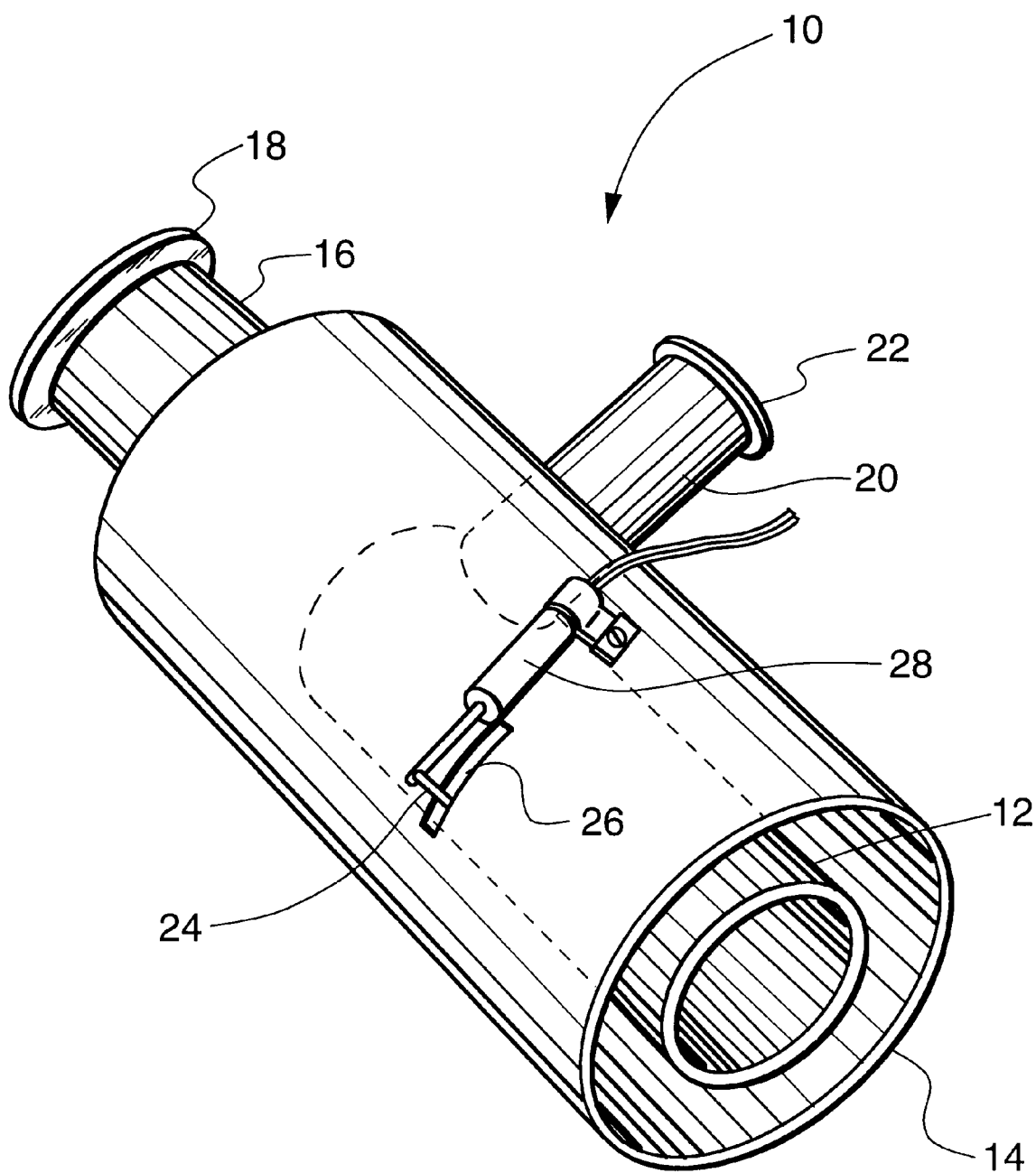
FIG. 1 is a perspective view of the preferred embodiment of the invention.

FIG. 1 is a perspective view of the preferred embodiment of loading spout 10 of the invention in which the inner cylinder, air plenum 12, is located within the outer cylinder, material conduit 14.

Material conduit 14 is supplied with granular material at supply pipe 16 at its upper end from a tube (not shown) which is connected to flange 18, and air plenum 12 is supplied with a flow of air at air pipe 20 from a tube (not shown) connected to flange 22. Arm 24 penetrates slot 26 in material conduit 14 and is connected to pneumatic piston 28 to operate the granular material control valve, as is described in more detail in the discussion of FIG. 3.

Figure 2:
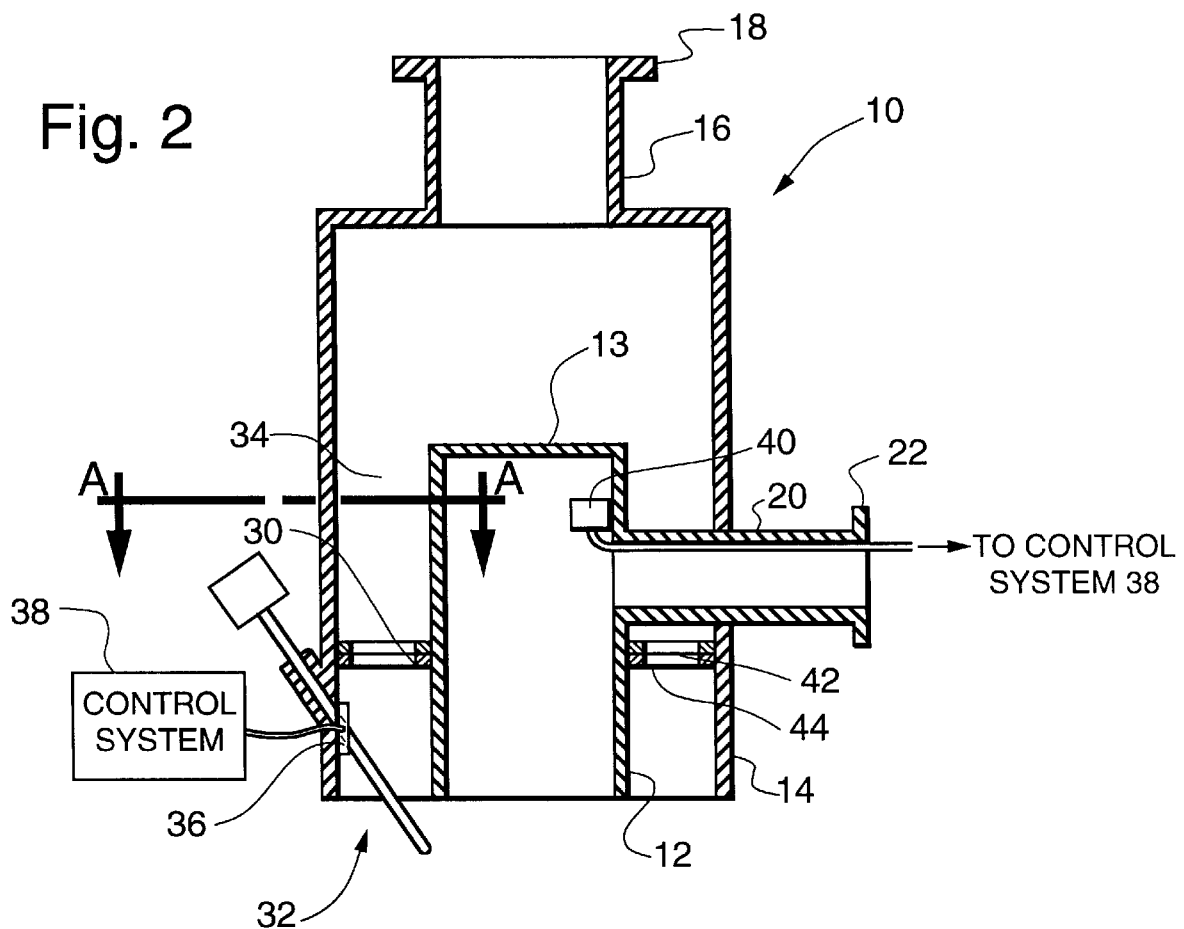
FIG. 2 is a cross section view of the preferred embodiment of the invention through the axis of the outer cylinder wherein the spout is open to the passage of material.

FIG. 2 is a cross section view of the preferred embodiment of loading spout 10 of the invention across the axis of material conduit 14. FIG. 2 more clearly shows the location of granular flow control valve 30 and other features of the invention. FIG. 2 also shows that air plenum 12 is closed off by end plate 13 at the end of air plenum 12 nearest to granular material supply pipe 16 so that the air entering air plenum 12 at pipe 20 flows only to open end 32 of loading spout 10. When loading spout 10 is in use, open end 32 of loading spout 10 is located below supply pipe 16, and the granular material moves through spout 10 due to gravity and leaves spout 10 at open end 32 along with the air flowing out of air plenum 12.

It is the air stream leaving air plenum 12 which erodes any mound of granular material which builds up under open end 32 of loading spout 10.

Granular flow control valve 30 is located within loading spout 10 in annular space 34 between air plenum 12 and material conduit 14, and level sensor 36 is located below control valve 30 where it can detect an accumulation of granular material which may build up near or into spout 10. Level sensor 36 is interconnected with control system 38, which is also connected to and controls pneumatic piston 28. Level sensor 36 is positioned at a predetermined level in loading spout 10. Preferably, level sensor 36 is located just below open end 32 of loading spout 10.

Thus, when level sensor 36 detects a mound of material building up to its location, control system 38 activates pneumatic piston 28 to close control valve 30 and stop the flow of granular material through loading spout 10. Since this action stops only the flow of granular material and not the flow of air through air plenum 12, the air stream continues to move the mound of granular material until level sensor 36 no longer detects material at its location, and control system 38 then reopens control valve 30. Preferably control value 30 and its associated controls will have at least three positions: full closed, full open, and "spreading". Full open position is used at the very start of filling; it allows the greatest fill rate, and the air does not need to be on at this point—filling is by pure gravity. In such a position, holes 43 in rotating plate 42 (as described in detail in the description portion of FIG. 3) are in complete alignment with holes 45 with fixed plate 44. The intermediate "spreading" position is used once material has filled as far as it can by gravity. This position cuts back the material flow rate to a point at which the material can be spread by the input air flow. In the spreading position the holes 45 in fixed plate 44 are partially, but not completely, blocked by rotating plate 42. There can be a plurality of such intermediate settings, where the passage of material is impeded to various degrees. For example, the valve means can be set to gradually close off holes 45 as the pressure in the system rises.

The full closed position is then used once the compartment is full and during spreader head movement from hatch to hatch. As indicated, the purpose of level sensor 36 is to detect when to move the from the "full open" position to the "spreading" position and to any intermediate position. The pressure switch is used to determine that the compartment is full.

FIG. 2 also shows an appropriate location for air pressure switch 40. It should be appreciated, however, that since an increase in air pressure can be detected in almost all locations within the air system, air pressure switch 40 could be positioned in many other locations, including back at the source of the air flow. A recommended position is on the entrance to the spreader housing, as too much volume between the pressure switch and the spreader housing could cause slow air shut down. Air pressure switch 40 is interconnected with control system 38, and since an increase in air pressure within the air flow path is a good indicator that loading spout 10 has completed the filling of the container being loaded, an air pressure increase above a predetermined level detected by air pressure switch 40 is used to close control valve 30 so that loading spout 10 can be withdrawn from the container it is filling.

Figure 2A:
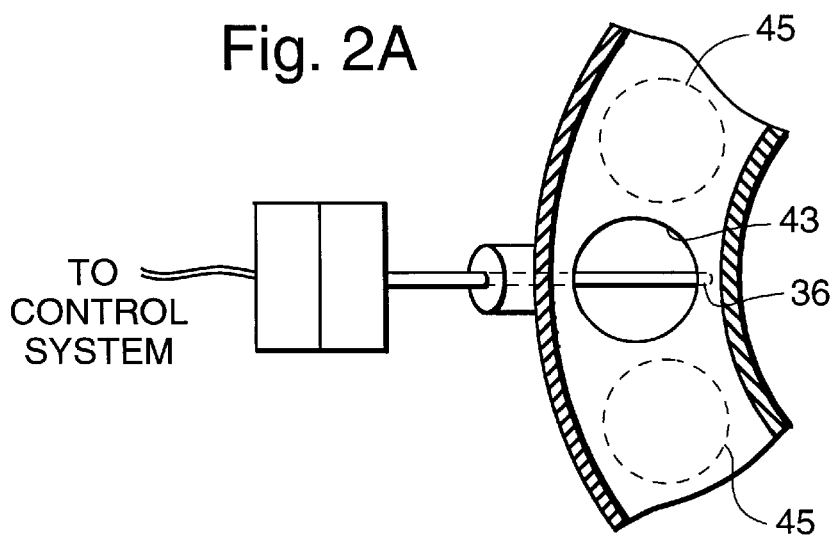
FIG. 2A is a view from perspective A—A of FIG. 2, with the spout being fully closed to the passage of material.

FIG. 2A illustrates that the position of the level sensor 36 relative to holes 45 is beneath and between fixed holes 45 so that the material flow through holes 45 will not generate a false reading in sensor 36.

FIG. 2A shows the spout in a closed position to material flow, as there is no overlap between fixed holes 45 and moveable holes 43.

Figure 3:
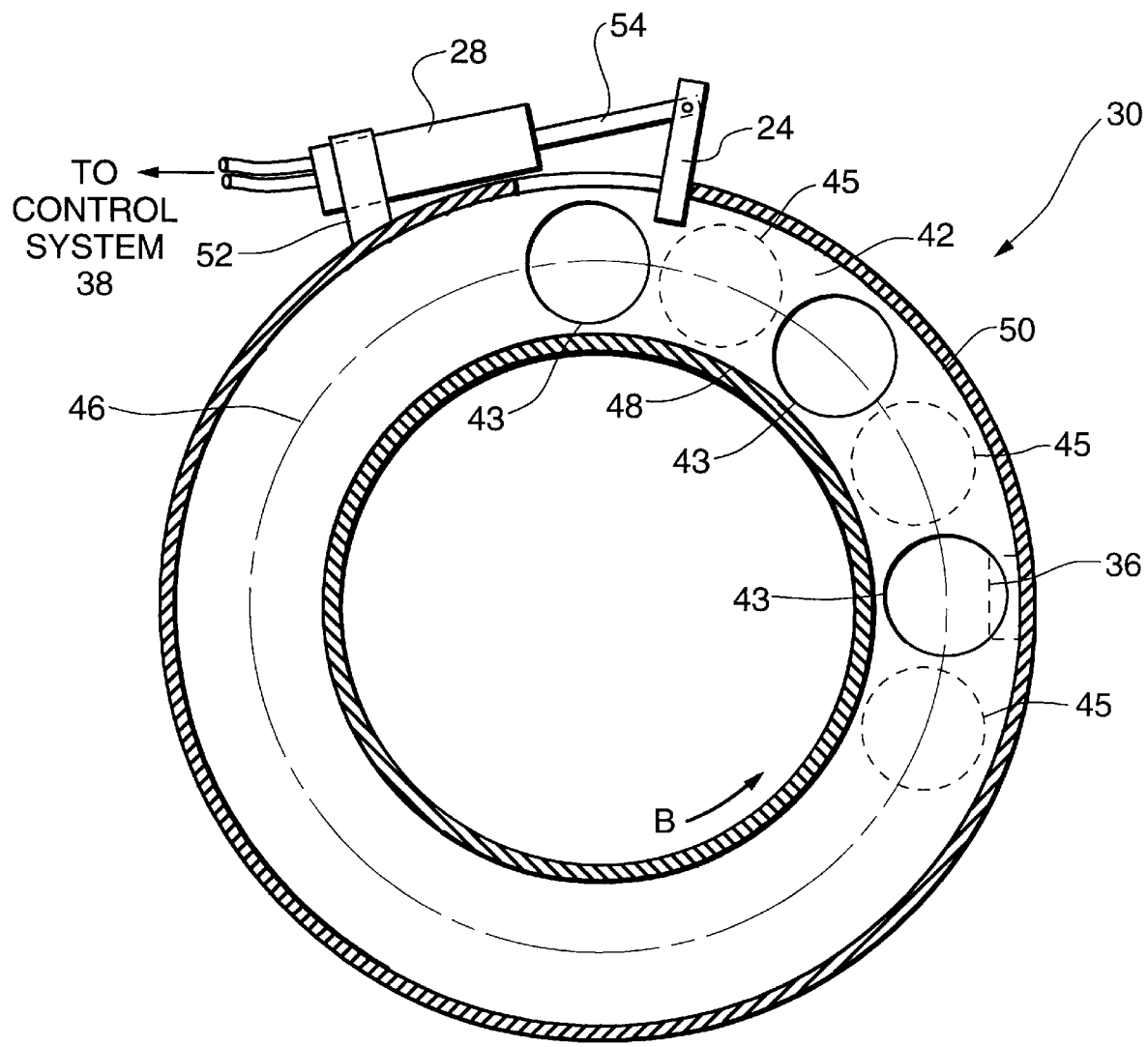
FIG. 3 is a plan view of the granular material flow control valve of the preferred embodiment of the invention.

FIG. 3 is a plan view of granular material flow control valve 30 of the preferred embodiment of the invention as seen from the side of rotating plate 42. The holes around rotating plate 42 and the holes around fixed plate 44, which in FIG. 3 are covered by rotating plate 42, continue completely around the plates and are centered on arc 46, but are not all shown in FIG. 3.

When installed within spout 10, as seen in FIG. 2, inner edges 48 of fixed plate 44 and rotating plate 42 are adjacent to air plenum 12 and outer edges 50 of the plates are adjacent to the inner surface of outer cylinder 14. Fixed plate 44 is attached to the cylinders by such means as welding, but rotating plate 42 is free to rotate.

The motive means to rotate rotating plate 42 is pneumatic piston 28 which is held fixed at one end by support 52 which is attached to material conduit 14, as seen in FIG. 1. Moving rod 54 of pneumatic piston 28 is connected to arm 24 that is attached to rotating plate 42. Thus, when pneumatic piston 28 retracts moving rod 54, rotating plate 42 rotates in direction B, and holes 43 in rotating plate 42 move into position in alignment with holes 45 in fixed plate 44. With the holes aligned, granular material can flow through the plates and through spout 10. However, when the plates are positioned as shown in FIG. 3, with holes 43 located between holes 45, the flow of granular material through spout 10 is stopped.

Loading spout 10 of the invention can therefore be controlled to automatically reduce or cut off the flow of granular material when the accumulation of material rises too high under the housing of spout 10, and, as previously discussed, the granular material flow can also be stopped by sensing a rise in air pressure above a predetermined level which indicates when the receiving container is full.

As indicated, in a typical set up the level probe will send a signal to the control system to first move the valve plate to the "spreading" position and second to turn the spreading air flow on. The pressure switch ultimately sends a signal to close the valve plate and shut the air off because the compartment is full.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, other motive means, such as a hydraulic piston or a gear drive can be used to move flow control valve 30 between the closed and the open position.

What is claimed as new and for which Letters Patent of the United States are desired to be secured is:

1. A spout for granular materials comprising: a hollow outer cylinder with one open end and a second end which includes a connection to a source of granular material;

an hollow inner structure, located within the outer cylinder, with an open end adjacent to the open end of the outer cylinder and a connection to a source of flowing air;

a flow control valve located within the outer cylinder and outside the inner hollow structure, with the flow valve being capable of closing to prevent granular material from flowing through the outer cylinder and opening to permit granular material to flow through the outer cylinder; and a level sensor located within the outer cylinder beneath the flow control valve and positioned at a predetermined level, with the level sensor interconnected with the flow control valve so that when material accumulates at the location of the level sensor, the level sensor causes the flow control valve to close.

2. The spout of claim 1 wherein the inner hollow structure is a cylinder which is coaxial with the outer cylinder.

3. The spout of claim 1 wherein the inner hollow structure is a cylinder which is coaxial with the outer cylinder and the flow control valve is located in the space between the cylinders.

4. The spout of claim 3 wherein the flow control valve comprises:

a fixed plate located between the inner cylinder and the outer cylinder and including a group of holes through which granular material can flow;

a rotatable plate located adjacent to the fixed plate and including a group of holes which can be aligned with the group of holes on the fixed plate to permit material flow, and also including surfaces between its holes which can block the holes on the fixed plate; and a motive means which moves the rotatable plate between a first position in which its holes are aligned with the holes of the fixed plate and a second position in which the spaces between the holes of the rotatable plate block the holes in the fixed plate.

5. The spout of claim 4 wherein the motive means moves the rotatable plate between said first position, said second position and a third position in which the spaces between the holes in the rotatable plate partially block the holes in the fixed plate.

6. The spout of claim 4 wherein the motive means is a pneumatic piston attached to an arm connected to the rotatable plate.

7. The spout of claim 1 further including an air pressure sensor located in a location exposed to air flowing through the inner hollow structure and interconnected with the flow control valve so that when the pressure within the inner structure rises above a predetermined level the flow control valve closes.

* * * * *